US010439993B2

(12) United States Patent
Weis

(10) Patent No.: US 10,439,993 B2
(45) Date of Patent: Oct. 8, 2019

(54) MAPPING SYSTEM ASSISTED KEY REFRESHING

(71) Applicant: Cisco Technology, Inc., San Jose, CA (US)

(72) Inventor: Brian Eliot Weis, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 164 days.

(21) Appl. No.: 15/095,421

(22) Filed: Apr. 11, 2016

(65) Prior Publication Data
US 2017/0054692 A1 Feb. 23, 2017

Related U.S. Application Data

(60) Provisional application No. 62/207,138, filed on Aug. 19, 2015.

(51) Int. Cl.
H04L 9/32 (2006.01)
H04L 29/06 (2006.01)
H04L 12/46 (2006.01)

(52) U.S. Cl.
CPC ...... H04L 63/0428 (2013.01); H04L 12/4633 (2013.01); H04L 63/029 (2013.01);
(Continued)

(58) Field of Classification Search
CPC ............. H04L 12/4633; H04L 63/0272; H04L 63/029; H04L 63/0428; H04L 63/061; H04L 63/20
(Continued)

(56) References Cited

U.S. PATENT DOCUMENTS 7,844,261 B2 * 11/2010 Ratilainen .............. H04Q 3/005
379/142.09
8,284,943 B2 10/2012 Carrasco
(Continued)

OTHER PUBLICATIONS

David Meyer, "The Locater Identifier Separation Protocol (LISP)", LISP—The Internet Protocol Journal, vol. 11, No. 1—Cisco Systems, 6 pages, downloaded from the internet on Jan. 28, 2016.
(Continued)

Primary Examiner — Gary S Gracia
(74) Attorney, Agent, or Firm — Edell, Shapiro & Finnan, LLC

(57) ABSTRACT

Presented herein is a system to set up a secure connection between nodes on two enterprise networks across a public network. The system includes a network element associated with each enterprise network. The first network element transmits a map request to a mapping server. The map request includes a destination address on the second enterprise network and a peer introduction request. The first network element includes a first key generation material in the peer introduction request. The second network element is configured to receive the map request forwarded from the mapping server, generate a map reply corresponding to the map request, and transmit the map reply to the first network element. The map reply includes a peer introduction reply with a second key generation material. The first network generates a secure key by inserting the second key generation material into a first key derivation function.

20 Claims, 7 Drawing Sheets

(52) U.S. Cl.
CPC ........ *H04L 63/0272* (2013.01); *H04L 63/061* (2013.01); *H04L 63/20* (2013.01)

(58) Field of Classification Search
USPC ..... 713/153, 162, 171; 380/277, 278; 726/2, 726/3, 11, 14, 15
See application file for complete search history.

(56) References Cited

U.S. PATENT DOCUMENTS

| | | | | |
|---|---|---|---|---|
| 8,548,171 | B2* | 10/2013 | McGrew | H04L 9/0833 380/259 |
| 9,294,393 | B1* | 3/2016 | Mullooly | H04L 41/12 |
| 2007/0143408 | A1* | 6/2007 | Daigle | H04L 51/04 709/206 |
| 2008/0215880 | A1* | 9/2008 | Guichard | H04L 63/0272 713/162 |
| 2010/0223458 | A1* | 9/2010 | McGrew | H04L 9/0833 713/153 |
| 2010/0281251 | A1* | 11/2010 | Arauz Rosado | H04L 12/4641 713/152 |
| 2010/0316054 | A1* | 12/2010 | Xu | H04L 12/4633 370/392 |
| 2012/0173694 | A1* | 7/2012 | Yan | H04L 12/4641 709/223 |
| 2012/0265982 | A1* | 10/2012 | Wang | H04W 12/04 713/155 |
| 2013/0145011 | A1 | 6/2013 | Hyatt et al. | |
| 2013/0145152 | A1* | 6/2013 | Maino | H04L 63/0428 713/156 |
| 2014/0297875 | A1* | 10/2014 | Cheng | H04L 61/103 709/226 |

OTHER PUBLICATIONS

"WAN Virtualization Using Over the ToP (OTP)", White Paper, Cisco Systems, Inc., 2013, 30 pages.

* cited by examiner

MAPPING SYSTEM ASSISTED KEY REFRESHING

PRIORITY CLAIM

This application claims priority to U.S. Provisional Patent Application No. 62/207,138, entitled "Mapping System Assisted Key Refreshing" and filed on Aug. 19, 2015, the entirety of which is incorporated herein by reference.

TECHNICAL FIELD

The present disclosure relates to virtual private networks.

BACKGROUND

Networks used in computing environments can be configured in many different ways. For example, a Local Area Network (LAN) is a group of computing devices that share a common communications line. Computing and storage resources can be shared within a LAN. Moreover, a LAN can be as small as a few computing devices or as large as an entire enterprise (e.g., office building, office complex, and the like). Another network configuration is a Wide Area Network (WAN). A WAN is a geographically dispersed telecommunications network. A classic example of a well known WAN is the Internet. A third network configuration is a Metropolitan Area Network (MAN), where computing devices are connected in a geographic region or specific area that is larger than a LAN and smaller than the typical WAN. Also, in recent years a new type of network, referred to as a Virtual Private Network (VPN), has emerged in the industry. A VPN is a private network that takes advantage of public telecommunications and maintains privacy through use of tunneling protocols and security procedures.

For example, a company or business may enable a VPN within its network, and a public network (e.g., the Internet) may be used to route communications between a remote device and devices within the company's VPN. Thus, remote devices can use "virtual" connections via a public network to connect to, and exchange secure communications with, devices within a VPN. These communications can also be encrypted so that devices that are not authenticated or otherwise allowed to access the VPN are unable to decrypt and access the communications.

DESCRIPTION OF EXAMPLE EMBODIMENTS

Overview

Figure 1:
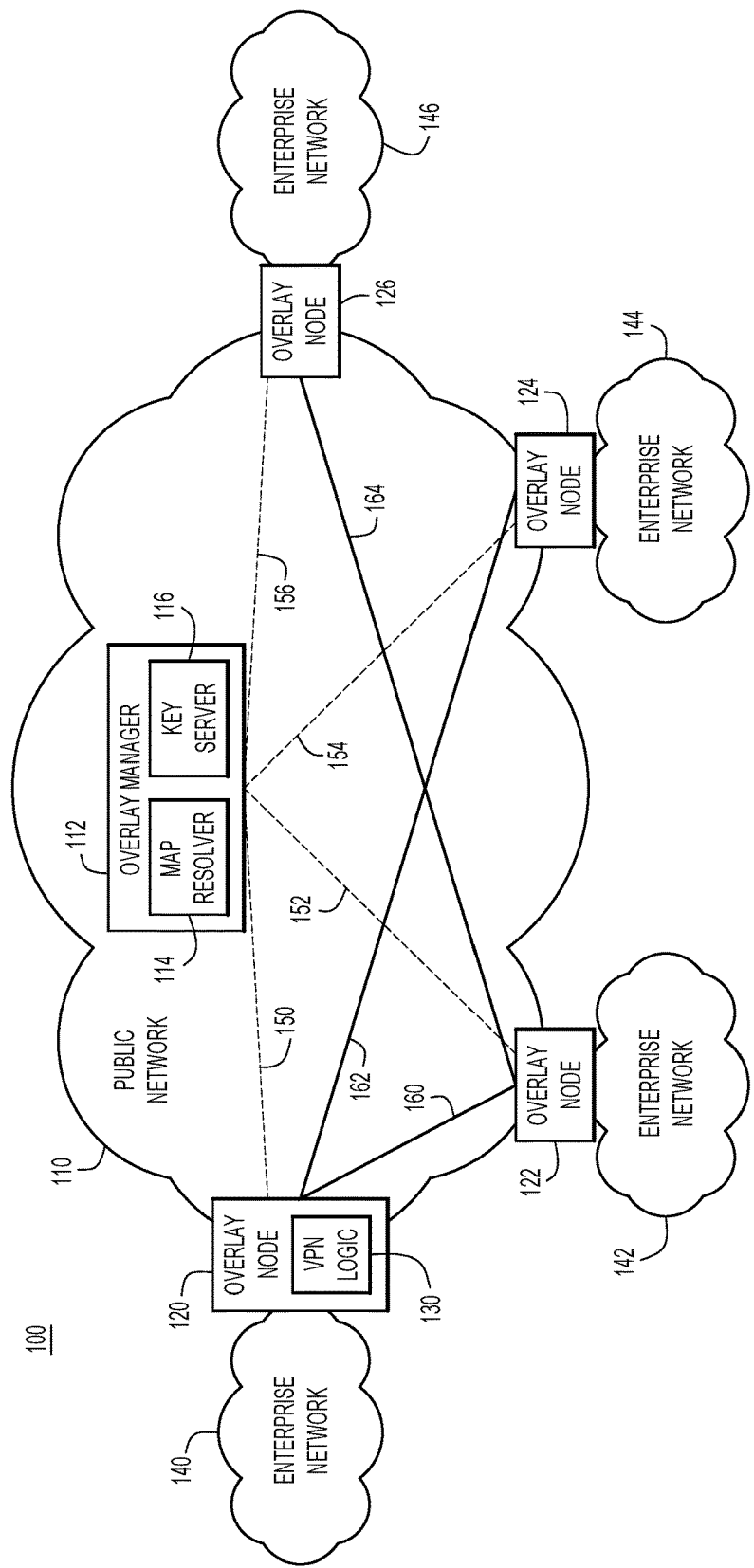
FIG. 1 is a block diagram illustrating a VPN system configured to set up secure tunnels in accordance with an example embodiment.

Presented herein is a system configured to set up a secure connection across a public network. The system comprises a first network element associated with a first enterprise network and a second network element associated with a second enterprise network. The first network element is configured to transmit a map request to a mapping server. The map request includes a destination address on the second enterprise network and a peer introduction request. The peer introduction request comprises a first key generation material. The first network element is also configured to receive a map reply including a peer introduction reply. The peer introduction reply includes a second key generation material. The first network element is further configured to generate a first key by inserting the second key generation material into a first key derivation function. The second network element is configured to receive the map request forwarded from the mapping server and generate the map reply corresponding to the map request. The map reply includes the peer introduction reply corresponding to the peer introduction request. The second network element is also configured to transmit the map reply to the first network element.

DETAILED DESCRIPTION

Current Virtual Private Network (VPN) technologies use distributed network protocols to create VPNs for customers on top of a shared network infrastructure (e.g., either Multiprotocol Label Switching (MPLS) or Internet Protocol (IP) based) that interconnects Customer Premises Equipment (CPE). iVPN is an example of an edge-to-edge IP Overlay Layer 2 (L2)/Layer 3 (L3) VPN system architecture and associated techniques that utilize a centralized control infrastructure as the single policy control point for all network services so as to integrate VPN policy, Traffic Engineering (Segment Routing) policy, and service insertion policy (NSH). iVPN is a Service Provider (SP) managed service providing Enterprise VPN services over a Service Provider network.

In one example, an iVPN Enterprise Encryption domain that is composed of three primary layers. The lowest layer represents an overlay technology (e.g., Locator/ID Separation Protocol (LISP) or Virtual Extensible LAN (VXLAN)) protected for confidentiality and integrity by the Internet Protocol Security (IPsec). This results in IPsec Tunnels over a shared IP or MPLS underlay network infrastructure.

A LISP or VxLAN overlay is setup using a LISP control plane, using a "LISP Mapping Server" in the middle layer of the iVPN Enterprise Encryption domain. The IPsec session keys are determined according to a Key Server, such as a Centralized Key Management (CKM) server. The intelligence of iVPN comes from the orchestration servers in the highest layer of the iVPN Enterprise Encryption domain, which determines policy for both LISP and for CKM.

The CKM Server distributes keying material to the overlay nodes. The keying material may be a single group key or may be Key Generation System (KGS) keying material. In either case, there is a need for the overlay nodes to exchange information that is used in a key derivation function (KDF), to ensure that each session has unique session keys. As such, when the distributed keying material is a group key, having all overlay nodes install pairwise SAs using the same group key may be cumbersome. When KGS technology is used, peers must know the identity of their peer and exchange nonces in order to compute private pair-wise keys.

In some CKM arrangements, peer overlay nodes may deploy an exchange called the Peer Introduction Protocol (PIP). In such arrangements, the peers exchange nonces used with a KDF to derive IPsec session keys from session keying material that is common to those peers in order to derive that session keying material. In a CKM arrangement using a KGS system, the PIP exchange may additionally exchange KGS identities used by the peers to derive IPsec session keys. The CKM PIP exchange is a general purpose protocol that can be used with any overlay, but there are several issues that arise when used with iVPN. In particular, the CKM PIP exchange adds complexity in the form of an additional control plane and the PIP exchange adds additional latency to start the flow of data. In addition, the state setting up the LISP overlay is not synchronized with the state setting up the security for the overlay. It would be more reliable if the state was distributed together. This is particularly true with a LISP control plane, since a LISP registration flow refers to a unidirectional data flow. If the data flow is actually bi-directional, then there will also be an independent reverse direction LISP control plane flow.

In one example, one of the peers (e.g., peer overlay nodes) needs to learn the cryptographic identity of another peer before it can compute a pairwise key with that peer. As such, a Peer Introduction Exchange (PIP) follows the Map-Request/Map-Reply flow. A possible optimization combines PIP with the Map-Request/Map-Reply.

For example, when a first router needs a Routing Locator for a second router, the first router sends a Map-Request to a Mapping Server. The Mapping Server forwards this Map-Request to the second router, which returns its Routing Locator with a Map-Reply to the first router. The first router initiates a PIP Exchange to the second router to exchange cryptographic identities. The first router and the second router can then generate their pairwise key.

In accordance with examples presented herein, an alternative to the PIP exchange is proposed for use with or without KGS technology. More particularly, in accordance with examples presented herein, the CKM method is adapted to work more efficiently and reliably with the LISP control plane. The CKM method of deriving IPsec secret keys is adapted for use with other types of keying material besides KGS.

Referring now to FIG. 1, an example of a VPN system 100, e.g., an iVPN system, is shown. Network traffic through a shared, public network 110 is coordinated through an overlay manager 112. The overlay manager 112 comprises a map resolver 114 and a key server 116. The map resolver 114 is responsible for maintaining network information on all of the overlay nodes in the public network 110. The key server 116 provides key management services, e.g., CKM services, to each of the overlay nodes in the public network 110.

The public network 110 includes overlay nodes 120, 122, 124, and 126. VPN logic 130 allows overlay node 120 to set up secure VPN tunnels to each of the other overly nodes. Similar VPN logic may be present in each of the other overlay nodes 122, 124, and 126. Each of the overlay nodes 120, 122, 124, and 126 connect an enterprise network 140, 142, 144, and 146, respectively, to the public network 110. In one example, each enterprise network is a physically separate computer network that may be part of a larger private network spanning a plurality of enterprise networks. In other words, a private network may comprise multiple enterprise networks connected through VPN tunnels over the public network 110. Each enterprise network may include one or more nodes (not shown in FIG. 1), each of which is addressable on a private network.

In one example, the overlay nodes 120, 122, 124, and 126 act as the edge of enterprise networks 140, 142, 144, and 146, respectively. The overlay nodes may be a virtual branch server, a data center, or physical customer edge devices that exchange enterprise traffic over the public network 110. Unlike a traditional VPN (e.g., a Dynamic Multipoint VPN (DMVPN)), the overlay nodes 120, 122, 124, and 126 may not have a routing protocol running between the nodes. Additionally, the overlay nodes 120, 122, 124, and 126 may not have persistent IPsec tunnels running between the nodes. The Next Hop Resolution Protocol (NHRP) used in DMVPN does not exchange cryptographic identities and nonces along with the "next-hop" information. A separate PIP exchange is used in DMVPN to handle the cryptographic identity and nonce exchange. Since the NHRP distributes next-hop information with the IPsec tunnels, and the nonce/KGS identity exchange must happen before the IPsec tunnels are set up, NHRP cannot be combined with the peer introduction exchange as described herein.

The overlay nodes 120, 122, 124, and 126 may depend on a LISP mapping system to inform each node which peer node should receive enterprise packets for a particular enterprise private IP address, also referred to herein as an Endpoint Identifier (EID). The overlay nodes 120, 122, 124, and 126 communicate with the overlay manager 112 through connections 150, 152, 154, and 156, respectively. The connections 150, 152, 154, and 156 allow each respective overlay node 120, 122, 124, and 126 to query the map resolver 114 regarding the network address of another overlay node. The overlay nodes 120, 122, 124, and 126 may also communicate with key server 116 over the connections 150, 152, 154, and 156, respectively, to provide centralized key management services.

The overlay node 120 communicates data between enterprise network 140 and enterprise network 142 through a tunnel 160 to overlay node 122. Similarly, the overlay node 120 communicates data between enterprise network 140 and enterprise network 144 through a tunnel 162 to overlay node 124. Additionally, the overlay node 122 communicates data between enterprise network 142 and 146 through a tunnel 164 to overlay node 146.

In one example of a CKM system, each overlay node 120, 122, 124, and 126 contacts the key server 116 (e.g., using a Group Domain of Interpretation (GDOI) registration protocol), and receives the policy necessary to join the VPN. The key server 116 provides keying material and the policy used to protect VPN traffic across the public network 110. The key server 116 may also coordinate other VPN states, such as a GDOI rekeying policy. As one example, when the overlay node 120 sets up the VPN tunnel 160 (e.g., an overlay link using the LISP data plane), the overlay node 120 uses the CKM policy pushed from the key server 116 to derive a key and protect the VPN tunnel 160 according to the policy. If there is a change in policy, the key server 116 may push fresh VPN keying material and policy to the overlay nodes 120, 122, 124, and 126, and an orderly rollover may occur on a schedule determined by the key server 116.

In another example of a CKM system, the key server 116 may distribute keying material that can be used by the overlay nodes 120, 122,124, and 126 to efficiently generate secret pairwise keys, e.g., a KGS. The key server 116 delivers slightly different keying material to each overlay node 120, 122, 124, and 126, all of which are mathematically related such that none of the other overlay nodes (e.g., overlay nodes 124 and 126) can compute the key shared between overlay nodes 120 and 122. The overlay nodes 120 and 122 exchange some parameters (e.g., identities and/or nonces) using a peer introduction protocol. Using the exchanges parameters, the overlay nodes 120 and 122 compute the pairwise key as the IPsec session key to secure the VPN tunnel 160.

Figure 2:
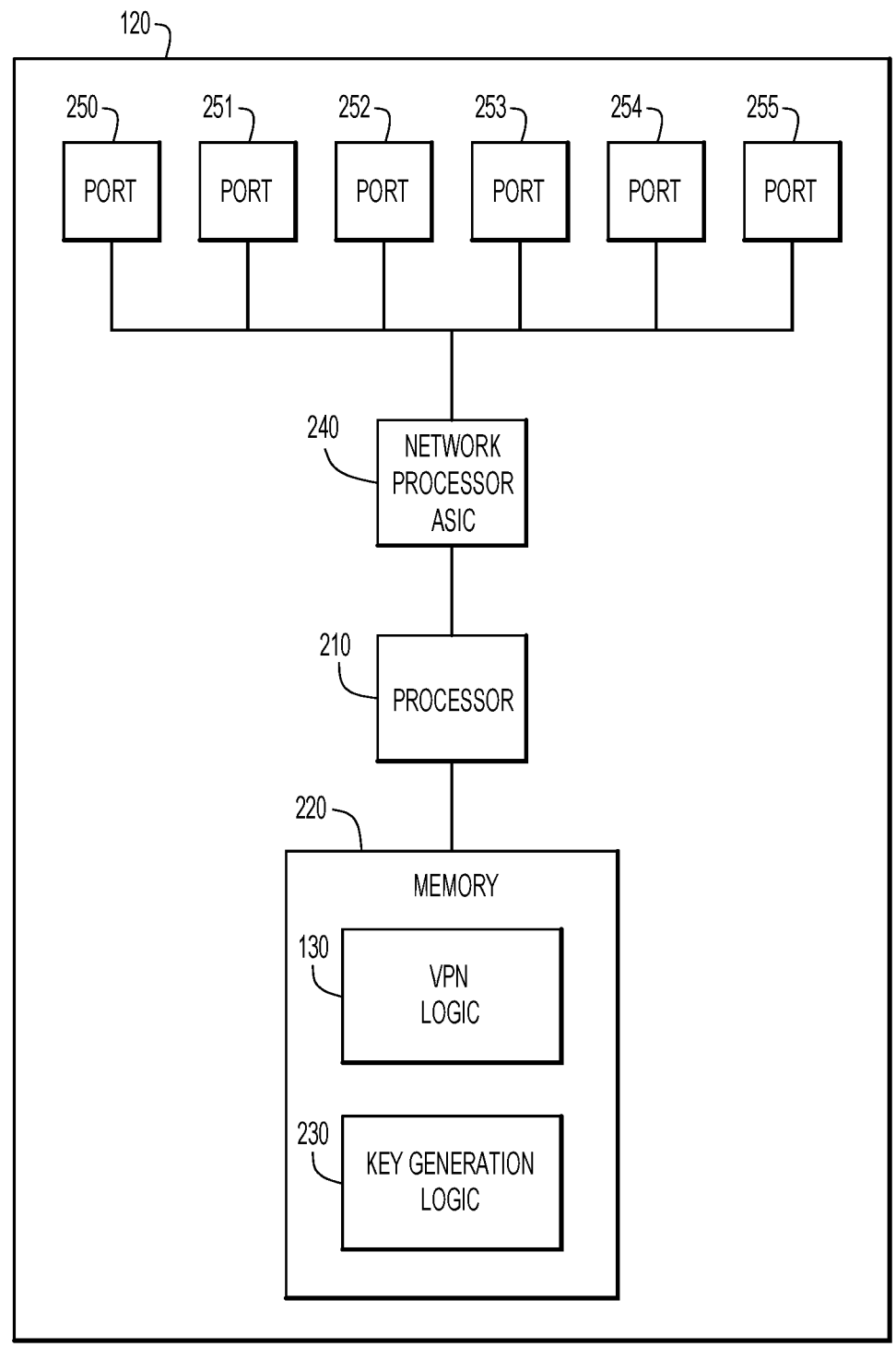
FIG. 2 is a block diagram of an overlay node network device in the VPN system according to an example embodiment.

Referring now to FIG. 2, a simplified block diagram is shown of an overlay node 120 configured to route enterprise traffic securely over the public network 110 according to the techniques presented herein. Overlay node 120 is used as an example of an overlay node, and overlay nodes 122, 124, and 126 may include similar components. Overlay node 120 includes, among other possible components, a processor 210 to process instructions relevant to processing communication packets for the VPN system, and memory 220 to store a variety of data and software instructions (e.g., VPN logic 130, key generation logic 230, communication packets, etc.). The overlay node 120 also includes a network processor application specific integrated circuit (ASIC) 240 to process communication packets that flow through the overlay node 120. Network processor ASIC 240 processes communication packets be sent to and received from ports 250, 251, 252, 253, 254, and 255. While only six ports are shown in this example, any number of ports may be included in overlay node 120.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (e.g., by the processor 210) it is operable to perform the operations described herein.

It is to be understood that the overlay node 120 may be a physical device or a virtual (software) device. In the latter case, the overlay node 120 is embodied as software running on a compute node (e.g., in a datacenter or other environment) through which traffic is directed and for which determinations are made as to how packets are to be routed across the public network 110.

Figure 3:
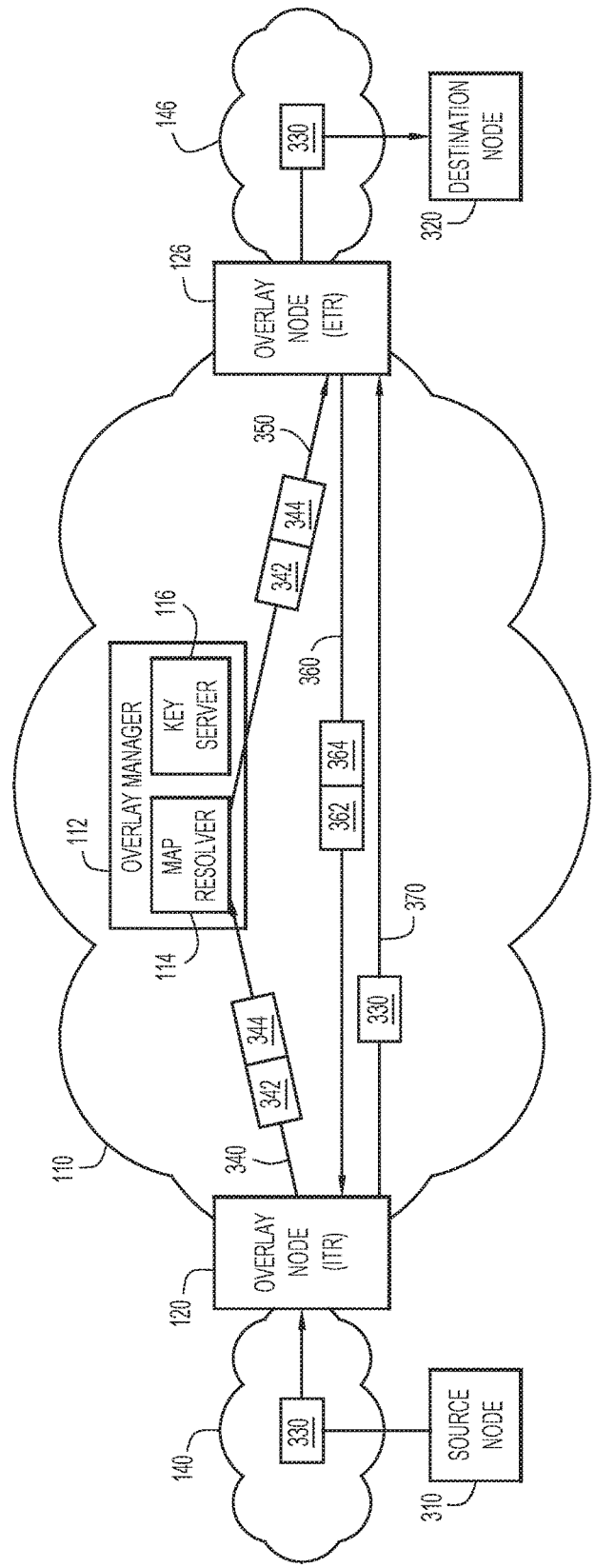
FIG. 3 illustrates messages passed in setting up a secure VPN tunnel according to an example embodiment.

Referring now to FIG. 3, a simplified block diagram illustrates two overlay nodes setting up a VPN tunnel to pass data from a source node 310 to a destination node 320 on a separate enterprise network. The source node 310 is a node on enterprise network 140, and generates a data frame 330 with a destination address of the destination node 320. The overlay node 120, which is also on enterprise network 140, receives the data frame 330 and determines that the destination address of data frame 330 is not among the addresses associated with enterprise network 140. Additionally, the overlay node 120 determines that it does not have a network address (e.g., Routing Locator (RLOC)) associated with the destination address of destination node 320.

Since the destination node 320 is on a different enterprise network, the overlay node 120 will create a tunnel through the public network 110 to the overlay node 126 associated with the enterprise network 146 that includes the destination node 320. For the data frame 330 traversing from the enterprise network 140 to the enterprise network 146, the overlay node 120 may also be called an Ingress Tunnel Router (ITR) and the overlay node 126 may be called an Egress Tunnel Router (ETR).

To determine the correct RLOC of the overlay node 126 on the public network 110, the ITR node 120 sends a map request 340 to the map resolver 114 of the overlay manager 112. The map request 340 includes an address request 342 comprising the RLOC for the ITR node 120 and the destination address (e.g., EID) of the destination node 320. The map request 340 also includes a peer introduction request 344 with cryptographic material associated with the ITR node 120. In one example, the cryptographic material in the peer introduction request may include a KGS identity and/or a nonce associated with the ITR node 120. The KGS identity and/or nonce included in the peer introduction request 344 may have been assigned to the ITR node 120 by the key server 116 in a centralized key management system.

The map resolver 114 receives the map request 340, and may additionally validate the map request 340 as being from ITR node 120 using a key shared between the map resolver 114 and the ITR node 120. The map resolver 114 determines the correct ETR node 126 based on the destination address included in the address request 342. Using a key the map resolver 114 shares with ETR node 126, the map resolver protects the address request 342 and peer introduction request 344 as a map request 350. The map resolver 114 forwards the map request 350 including both the address request 342 and the peer introduction request 344 to the overlay node 126.

In one example, the overlay manager 112 may or may not reply with a map reply (not shown in FIG. 3) directly to the ITR node 120, in addition to forwarding the map request 350 to the ETR node 126. This may allow the ITR node 120 to validate the map reply 360 that is later sent by the ETR node 126. This validation may mitigate some forms of re-direct attacks in which an unauthorized entity intercepts the forwarded map request 350 and sends an unauthorized map reply.

On receiving the map request 350, the ETR node 126 validates the map request using a key shared between the map resolver 114 and the ETR node 126. The ETR node 126 generates a map reply 360 comprising an address reply 362 and a peer introduction reply 364. The address reply 362 includes the network address (e.g., the RLOC) of the ETR node 126. The peer introduction reply 364 includes cryptographic material (e.g., a KGS identity and/or nonce) associated with the ETR node 126. The map reply 360 is protected with a key shared between the ETR node 126 and the ITR node 120 and transmitted to the ITR node 120. The ETR node 126 may also extract the cryptographic material associated with the ITR node 120 from the peer introduction request 344. The cryptographic material extracted from the peer introduction request 344 may be inserted into a Key Derivation Function (KDF) to generate a secure, pairwise key to encrypt traffic in a VPN tunnel between the ETR node 126 and the ITR node 120.

On receiving the map reply 360, and optionally validating the map reply 360 with a key shared by the ITR node 120 and the ETR node 126, the ITR node 120 extracts the network address (e.g., RLOC) of the ETR node 126 from the address reply 362. The ITR node 120 also extracts the cryptographic material associated with the ETR node 126 from the peer introduction reply 364. The cryptographic material is used to generate a pairwise key for a VPN tunnel between the ITR node 120 and the ETR node 126. With the pairwise key, the ITR node 120 can set up the secure VPN tunnel 370 to the ETR node 126 and transmit the data frame 330 along the VPN tunnel 370. The ETR node 126 removes the encapsulation of the VPN tunnel 370 and forwards the data frame 330 to the destination node 320.

In one example, the keys used to protect and validate map request 340, forwarded map request 350, and map reply 360 are a single group key shared between all of the overlay nodes and the overlay manager. In another example, public/private key pairs may be used to validate the messages, but this would typically require at least an additional message in the exchange to properly validate each message. The main security property gained from protecting the map request/map reply messages is integrity protection, though the messages may also be encrypted. In a further example, pairwise keys may be distributed to the overlay nodes that are secure enough to provide integrity protection, but not secure enough to encrypt and protect data traffic.

In another example, the cryptographic material passed in the peer introduction request 344 and the peer introduction reply 364 are not secure information, i.e., cryptographic keys are not passed in these messages. The values passed in the peer introduction exchange messages are used to permute keying material (e.g., a Key Derivation Function) that each overlay node already has stored. The main threats to these messages are an attacker changing the identities/nonces during transit or creating false messages. An attacker may affect communications, but would not cause an overlay node to reveal the actual keys.

In a further example, a LISP mapping system may be used with a LISP overlay encapsulation. A packet from source node 310 with an EID 10.1.1.1 addressed to the destination node 320 with EID 10.2.2.2 is routed to the LISP ITR node 120. The ITR node 120 does not have a mapping in its cache useable to determine which LISP ETR is responsible for the EID 10.2.2.2. As such, the ITR node 120 sends a Map-Request message 340 to the Map Resolver 114 asking for that information. The Map Resolver 114 has information regarding all of the LISP nodes and is able to determine the correct ETR node 126. The Map Resolver 114 then forwards the Map-Request message 350 to the correct ETR node 126. The ETR node 126 receives the Map-Request message 350, and responds to the ITR node 120 with a Map-Reply message 360. The Map-Reply message 360 provides the ITR node 120 with the public network address for the ETR node 126 (e.g., 12.1.1.1) which the ITR node 120 can use as the destination address of the overlay packet encapsulating data frame 330 in the VPN tunnel 370. As a result, the cache of the ITR node 120 now includes the required mapping and the ITR node 120 can encapsulate data packets destined to EID 10.2.2.2 in an overlay packet with a destination address of 12.1.1.1, which the public network 110 routes to the ETR node 126. The Map-Request/Map-Reply pair constitutes a single round trip setting up the connection.

As described above, there is a need to distribute some information between the ITR node 120 and ETR node 126 in order to derive IPsec session keys. In the CKM method, the ITR node 120 distributes an "initiator nonce" (I-Nonce) to the ETR node 126, and the ETR node 126 distributes a "responder nonce" (R-Nonce) to the ITR node 120. Additionally, when KGS technology is used, the ITR node 120 distributes its KGS identity (I-Identity), and the ETR node 126 distributes its KGS identity (R-Identity).

Also as noted above, the examples presented herein omit an explicit peer introduction protocol exchange between the ITR node 120 and the ETR node 126 by using the Map-Request and Map-Reply protocols (i.e., to send the nonces and identities). Adding the nonce information (and possible identity information) to the Map-Request/Map-Reply protocols ensures that the keying material derived for a particular Map-Request 340 is used with that particular ITR node 120 to ETR node 126 packet flow.

In accordance with one example method, when the ITR node 120 is missing a cache mapping for a particular EID, it formats a Map-Request message 340 and also adds its I-Nonce (and optionally I-Identity) to the peer introduction message 344. The information could be part of a modified LISP Security Type Link Aggregation Control Protocol (LACP), a new type of LACP, or another new protocol extension.

When the ETR node 126 receives the Map-Request 350, it processes it as above, but also extracts and stores the I-Nonce and I-Identity (if present) from the message 344. The ETR node 126 formats a Map-Replay message 360 and also adds its R-Nonce (and optionally R-Identity) to the Map-Reply 360 as part of the peer introduction reply message 364, and forwards the message 360 to the ITR node 120. The ETR node 126 also computes and installs IPsec session keys according to the policy distributed by the key server 116.

When the key server policy specifies that keys are to be derived using the KGS method, the CKM key derivation method is followed, i.e., keys are derived as data-keys=KDF (kgs-ss, E-Nonce || I-Nonce || R-Nonce). In this notation, the E-Nonce is a value distributed by the key server 116 to denote a particular version of keying material. The I-Nonce and R-Nonce correspond to nonces corresponding to the initiator (e.g., ITR node 120) and the responder (e.g., ETR node 126), respectively. When the key server policy specifies that keys are to be derived from a group key, the CKM key derivation method is used except that the "kgs-ss" is replaced by the group key, i.e., the keys are derived as data-keys=KDF(group-key, E-Nonce || I-Nonce || R-Nonce). Alternatively, the key server policy may specify that both the kgs-ss and the group key are used in the key derivation function, i.e., the keys are derived as data-keys=KDF(group-key, kgs-ss, E-Nonce || I-Nonce || R-Nonce). Using both the group key and the kgs-ss provides the key server 116 more flexibility in defining rekey policy.

Using the key derivation function specified by the key server policy, when the ITR node 120 receives the Map-Reply 360, it processes the Map-Reply 360 and extracts the R-Nonce (and optionally the R-Identity) from the peer introduction reply portion 364 of the Map-Reply 360. The ITR node 120 computes and installs IPsec session keys in the same manner as the keys were derived by the ETR node 126 as described above.

Figure 4A:
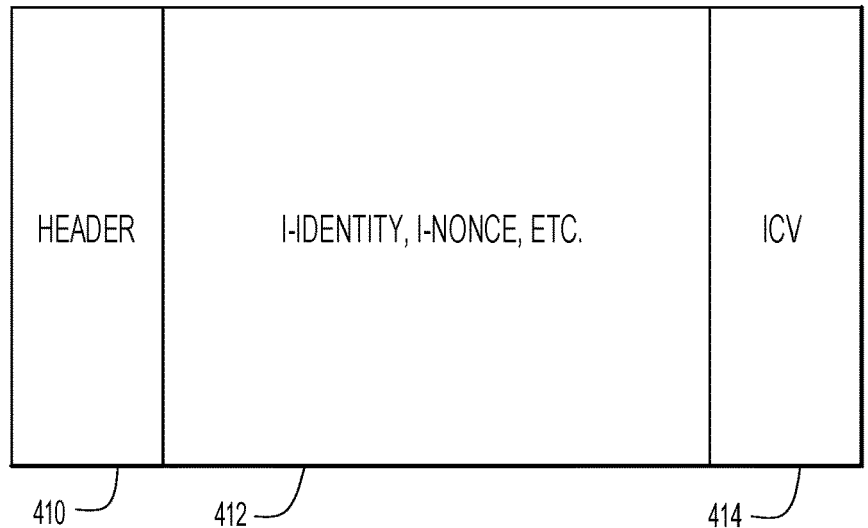
FIG. 4A illustrates a peer introduction request message according to an example embodiment.
Figure 4B:
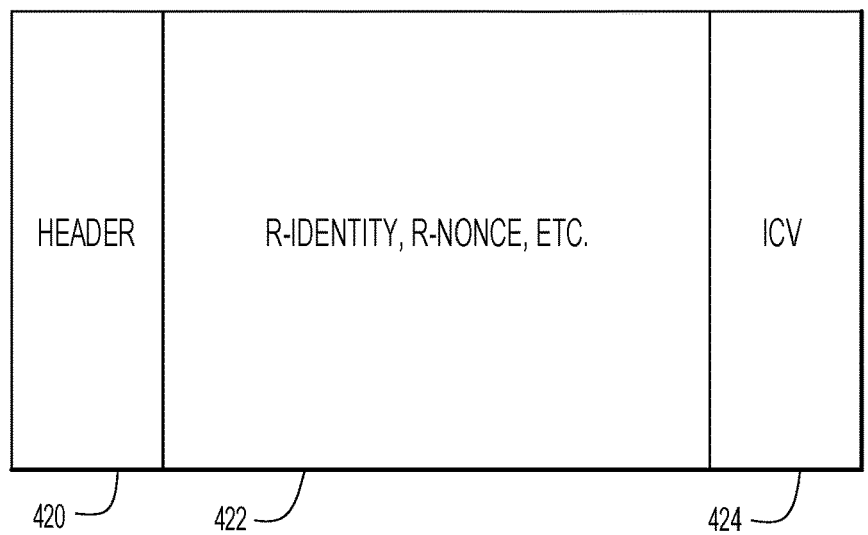
FIG. 4B illustrates a peer introduction reply message according to an example embodiment.

Referring now to FIGS. 4A and 4B, examples of peer introduction messages are shown. As shown in FIG. 4A, the peer introduction request 344 comprises a header 410, a payload 412, and an Integrity Check Value (ICV) 414. The header 410 may include a source address, a destination address, as well as various formatting options. The payload 412 includes the cryptographic material associated with the ITR node 120, such as a KGS identity and/or nonce. The ICV 414 provides a self contained integrity check, such as a checksum value. In one example, the header 410 and ICV 414 may be combined with the header and ICV of the overall map request 340, instead of maintaining a separate protocol overhead for the peer introduction request 344 portion of the map request 340.

FIG. 4B illustrates a peer introduction reply 364 corresponding to the peer introduction request 344 shown in FIG. 4A. The peer introduction reply 364 comprises a header 420, a payload 422, and an ICV 424. The header 420 may include a source address corresponding to the ETR node 126, a destination address corresponding to the ITR node 120, as well as various formatting options. The payload 422 includes the cryptographic material associated with the ETR node 126, such as a KGS identity and/or nonce. The ICV 424 provides a self contained integrity check, such as a checksum value. In one example, the header 420 and ICV 424 may be combined with the header and ICV of the overall map reply 360, instead of maintaining a separate protocol overhead for the peer introduction reply 364 portion of the map reply 360.

Figure 5:
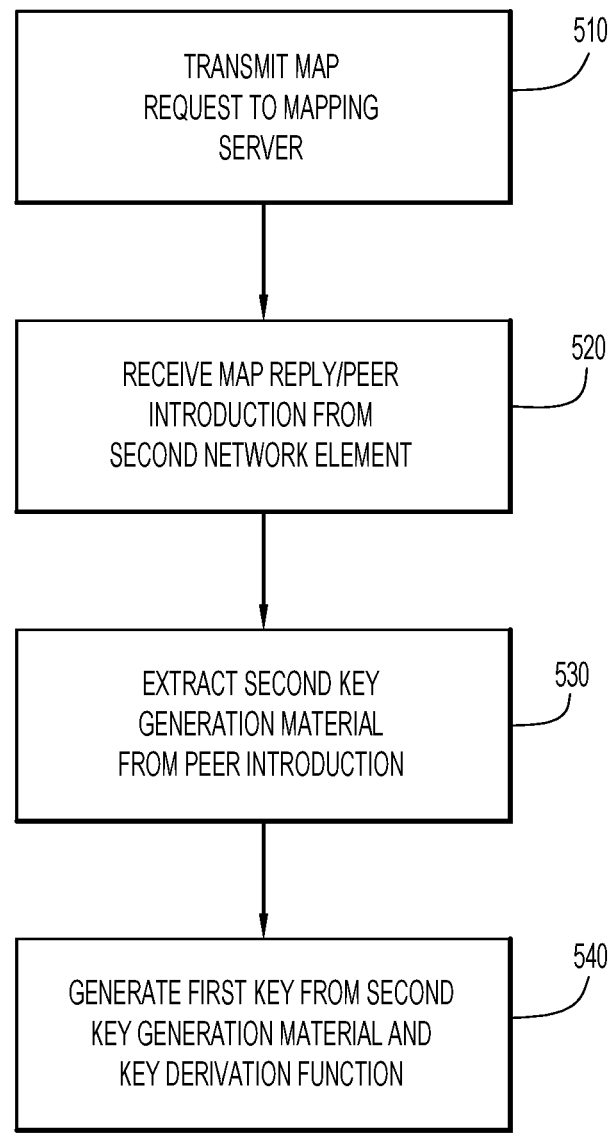
FIG. 5 is a flowchart showing operations performed at an ingress tunnel router to set up a secure tunnel according to an example embodiment.

Referring now to FIG. 5, a flowchart illustrates operations of a process 500 performed by a first network element (e.g., ITR node 120) in preparing to set up a VPN tunnel to a second network element (e.g., ETR node 126). In step 510, the first network element transmits a map request to a mapping server, e.g., map resolver 114. In one example, the first network element is an overlay node associated with a first enterprise network. The map request includes a destination address on a second enterprise network and a peer introduction request. The peer introduction request include a first key generation material (e.g., cryptographic material, KGS identity, nonce, etc.) associated with the first network element.

In step 520, the ITR node 120 receives a map reply from the second network element. The map reply corresponds to the map request transmitted to the mapping server and includes a peer introduction reply corresponding to the peer introduction request. The second network element may be an overlay node associated with the second enterprise network. In step 530, the first network element extracts a second key generation material, such as an identity and/or nonce associated with the second network element. The first network element generates a first key by inserting the second key generation material into a key derivation function. The first key may be used as a secure, pairwise key to set up the VPN tunnel between the first network element and the second network element.

Figure 6:
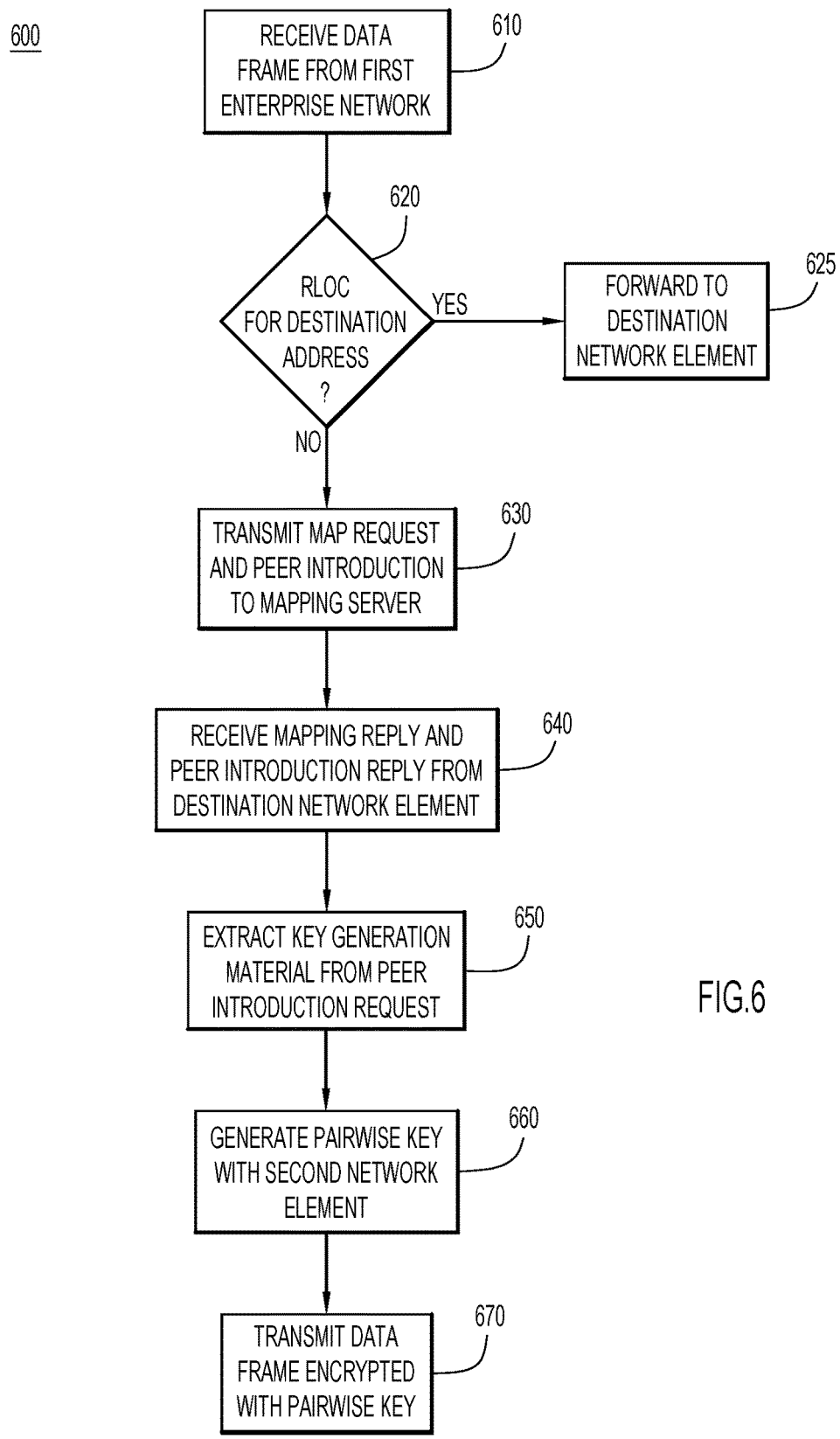
FIG. 6 is a flowchart showing operations performed at an ingress tunnel router to transmit data securely across the VPN tunnel according to an example embodiment.

Referring now to FIG. 6, a flowchart illustrates operations of a process 600 performed by a first network element (e.g., ITR node 120) in securely transmitting data to a second network element (e.g., ETR node 126) over a public network (e.g., public network 110). In step 610, the first network element receives a data frame from a node on a first enterprise network. The data frame includes a destination address (e.g., an EID) of a destination node. The first network element then determines if its cache has stored a public network address (e.g., an RLOC) associated with the destination EID in step 620.

If the first network element has stored an RLOC associated with the destination EID, then the first network element forwards the data frame to that RLOC in step 625. In one example, if there is a cache hit (i.e., the first network element has a stored RLOC associated with the destination EID), then that would be the result of a previous map request/reply exchange, which set up the cache. The techniques presented herein add the nonce/identity exchange to the same map request/reply exchange, so if there is a cache hit, then it is expected that the nonces were provided to the CKM system that created an installed pairwise IPsec Security Associations (SAs). If the IPsec SAs are missing from the CKM, then a traditional PIP exchange may be used to exchange nonces. However, this may cause data frames to be discarded during the interval that the first network element has a cache entry, but the IPsec has not yet installed the IPsec SAs.

If the first network element does not have an RLOC associated with the destination EID of the data frame, then the first network element transmits a map request to a mapping server (e.g., map resolver 114) in step 630. To facilitate sending the data frame quickly, the first network element includes a peer introduction request in the map request, which the mapping server will forward to the second network element. The peer introduction request includes first key generation material (e.g., a nonce and/or KGS identity) associated with the first network element. By including the peer introduction exchange with the map request/reply exchange, the cache entry at the first network element and the IPsec SAs can be performed at substantially the same time, since the necessary data to do both are obtained at the same time.

After the mapping server has forwarded the map request to the second network element, the second network element transmits a corresponding map reply, which the first network element receives in step 640. The map reply includes a peer introduction reply corresponding to the peer introduction request that was included in the map request. In step 650, the first network element extracts second key generation material associated with the second network element. Using the second key generation material, the first network element generates a pairwise key in step 660. The pairwise key will be used to communicate with the second network element, and may be generated by inserting the second key generation material into a key derivation function. In step 670, the first network element transmits the data frame encrypted with the pairwise key. In one example, the pairwise key is used to set up a VPN tunnel, and the data frame is sent along the VPN tunnel.

Figure 7:
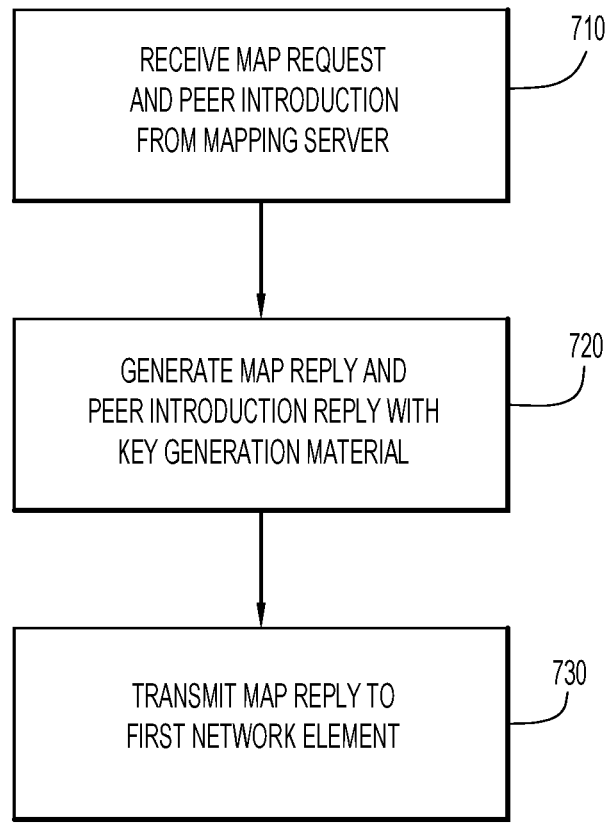
FIG. 7 is a flowchart showing operations performed at an egress tunnel router to prepare for a secure VPN tunnel according to an example embodiment.

Referring now to FIG. 7, a flowchart illustrates operations of a process 700 performed by a second network element (e.g., ETR node 126) in preparing to set up a VPN tunnel to a first network element (e.g., ITR node 120). In step 710, the second network element receives a map request from a mapping server (e.g. map resolver 114). The map request is forwarded by the mapping server from a first network element associated with a first enterprise network to the second network element associated with a second enterprise network. The map request includes a peer introduction request from the first network element. The peer introduction request includes first key generation material (e.g., a nonce and/or KGS identity) associated with the first network element.

In step 720, the second network element generates a map reply corresponding to the map request and inserts a peer introduction reply corresponding to the peer introduction request. The peer introduction reply includes second key generation material associated with the second network element. The second network element transmits the map reply including the peer introduction reply to the first network element in step 730.

As noted above, presented herein are techniques in which a centralized key management (CKM) method is adapted to work more efficiently and reliably with the LISP control plane. The CKM method of deriving IPsec secret keys may be adapted for use with other types of keying material besides KGS. Combining the CKM method of key derivation with LISP adds reliability to the IPsec Tunnel usage because both mapping and keying information reside in the same message flow.

In one form, the techniques presented herein provide for a computer-implemented method performed at a first network element to prepare a VPN tunnel across a public network. At a first network element associated with a first enterprise network, the method comprises transmitting a map request to a mapping server. The map request includes a destination address on a second enterprise network and a peer introduction request. The peer introduction request comprises a first key generation material associated with the first network element. The first network element receives from a second network element a map reply corresponding to the map request. The second network element is associated with a second enterprise network, and the map reply includes a peer introduction reply corresponding to the peer introduction request. The first network element extracts a second key generation material from the peer introduction reply. The second key generation material is associated with the second network element. The first network element generates a first key associated with the first network element and the second network element by inserting the second key generation material in a first key derivation function.

In another form, the techniques presented herein provide for a computer-implemented method performed at a second network element to set up a VPN tunnel with a first network element across a public network. At a second network element associated with a second enterprise network, the method comprises receiving a map request from a mapping server. The map request includes a destination address on the second enterprise network and a peer introduction request from a first network element associated with a first enterprise network. The second network element generates a map reply corresponding to the map request and includes a peer introduction reply in the map reply. The peer introduction reply corresponds to the peer introduction request and includes a second key generation material associated with the second network element. The second network element transmits the map reply to the first network element.

In a further form, the techniques presented herein provide for a system comprising a first network element associated with a first enterprise network and a second network element associated with a second enterprise network. The first network element is configured to transmit a map request to a mapping server. The map request includes a destination address on the second enterprise network and a peer introduction request. The peer introduction request comprises a first key generation material. The first network element is also configured to receive a map reply including a peer introduction reply. The peer introduction reply includes a second key generation material. The first network element is further configured to generate a first key by inserting the second key generation material into a first key derivation function. The second network element is configured to receive the map request forwarded from the mapping server and generate the map reply corresponding to the map request. The map reply includes the peer introduction reply corresponding to the peer introduction request. The second network element is also configured to transmit the map reply to the first network element.

In another form, the techniques presented herein provide for an apparatus comprising a network interface unit and a processor. The network interface unit is configured to communicate with a plurality of (physical or virtual) network elements. The processor is configured to perform any of the methods described and shown herein.

In still another form, a non-transitory computer readable storage media is provided that is encoded with instructions that, when executed by a processor, cause the processor to perform any of the methods described and shown herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a first network element associated with a first network address, wherein the first network element is an overlay node associated with a first enterprise network, transmitting a map request to a remote mapping server to store mappings between identifiers of network elements and network addresses of network elements, the map request including a request for a second network address of a second network element and a peer introduction request comprising a first key generation material associated with the first network element, wherein the map request causes the remote mapping server to forward the map request to the second network element at the second network address;
receiving, by the first network element, from the second network element, a map reply in response to the map request received at the second network element from the remote mapping server, the map reply including the second network address and a peer introduction reply in response to the peer introduction request, wherein the second network element is an overlay node associated with a second enterprise network;
extracting a second key generation material from the peer introduction reply, the second key generation material associated with the second network element; and
generating a first key associated with the first network element and the second network element by inserting the second key generation material in a first key derivation function, wherein the first key is used to set up a Virtual Private Network (VPN) tunnel between the first network element and the second network element to pass data from a first node within the first enterprise network to a second node within the second enterprise network.

2. The method of claim 1, wherein the map request is transmitted to the remote mapping server in response to receiving a data frame directed to the second network element and determining that the first network element does not have the second network address for the second network element.

3. The method of claim 2, further comprising:
encrypting the data frame with the first key; and
transmitting the encrypted data frame to the second network element.

4. The method of claim 1, wherein the first key generation material comprises a first identity associated with the first network element or a first nonce associated with the first network element and the second key generation material comprises a second identity associated with the second network element or a second nonce associated with the second network element.

5. The method of claim 1, wherein the map request comprises a Locator/Identifier Separation Protocol (LISP) request for a Routing Locator (RLOC) associated with the second network element.

6. The method of claim 1, wherein the first network element and the second network element are overlay nodes on a public network connecting the first enterprise network and the second enterprise network.

7. The method of claim 1, further comprising validating the map reply with a second key.

8. A method comprising:

at a second network element associated with a second network address, wherein the second network element is an overlay node associated with a second enterprise network, receiving a map request from a remote mapping server, the map request including a request for the second network address and a peer introduction request from a first network element associated with a first network address, wherein the remote mapping server forwarded the map request from the first network element to the second network element;

generating a map reply in response to the map request received at the second network element from the remote mapping server, the map reply including the second network address and a peer introduction reply in response to the peer introduction request, wherein the peer introduction reply includes a second key generation material associated with the second network element; and transmitting the map reply to the first network element, wherein the first network element is an overlay node associated with a first enterprise network, wherein the second key generation material enables the first network element to generate a first key used to set up a Virtual Private Network (VPN) tunnel between the first network element and the second network element to pass data from a first node within the first enterprise network to a second node within the second enterprise network.

9. The method of claim 8, further comprising:

extracting a first key generation material from the peer introduction request; and generating the first key associated with the first network element and the second network element by inserting the first key generation material into a second key derivation function.

10. The method of claim 9, further comprising:

encrypting data frames with the first key; and transmitting the encrypted data frames to the first network element.

11. The method of claim 8, further comprising validating the map request with a second key.

12. The method of claim 8, wherein the map reply comprises a Locator/Identifier Separation Protocol (LISP) reply including a Routing Locator (RLOC) associated with the second network element.

13. The method of claim 8, wherein the second key generation material comprises an identity associated with the second network element or a nonce associated with the second network element.

14. The method of claim 8, wherein the first network element and the second network element are overlay nodes on a public network connecting the first enterprise network and the second enterprise network.

15. A system comprising:

a first network element associated with a first network address, wherein the first network element is an overlay node associated with a first enterprise network, and the first network element:

transmits a map request to a remote mapping server, the map request including a request for a second network address of a second network element and a peer introduction request comprising a first key generation material, wherein the map request causes the remote mapping server to forward the map request to the second network element at the second network address;

receives a map reply including the second network address and a peer introduction reply comprising second key generation material; and generates a first key by inserting the second key generation material into a first key derivation function;

wherein the second network element is an overlay node associated with a second enterprise network, and the second network element:

receives the map request from the remote mapping server, the map request being forwarded by the remote mapping server from the first network element;

generates the map reply in response to the map request, the map reply including the second network address and the peer introduction reply in response to the peer introduction request; and transmits the map reply to the first network element, wherein the first key is used to set up a Virtual Private Network (VPN) tunnel between the first network element and the second network element to pass data from a first node within the first enterprise network to a second node with the second enterprise network.

16. The system of claim 15, wherein the first network element is configured to transmit the map request to the remote mapping server in response to receiving a data frame from the first enterprise network associated with the first network element, the data frame being directed to the second network element, and determining that the first network element does not have the second network address for the second network element.

17. The system of claim 16, wherein the first network element is further configured to encrypt the data frame with the first key and transmit the encrypted data frame to the second network element.

18. The system of claim 15, wherein the first key generation material comprises a first identity associated with the first network element or a first nonce associated with the first network element and the second key generation material comprises a second identity associated with the second network element or a second nonce associated with the second network element.

19. The system of claim 15, wherein the first network element is further configured to validate the map reply with a second key.

20. The system of claim 15, wherein the second network element is further configured to validate the map request with a second key.

* * * * *